UNITED STATES PATENT OFFICE.

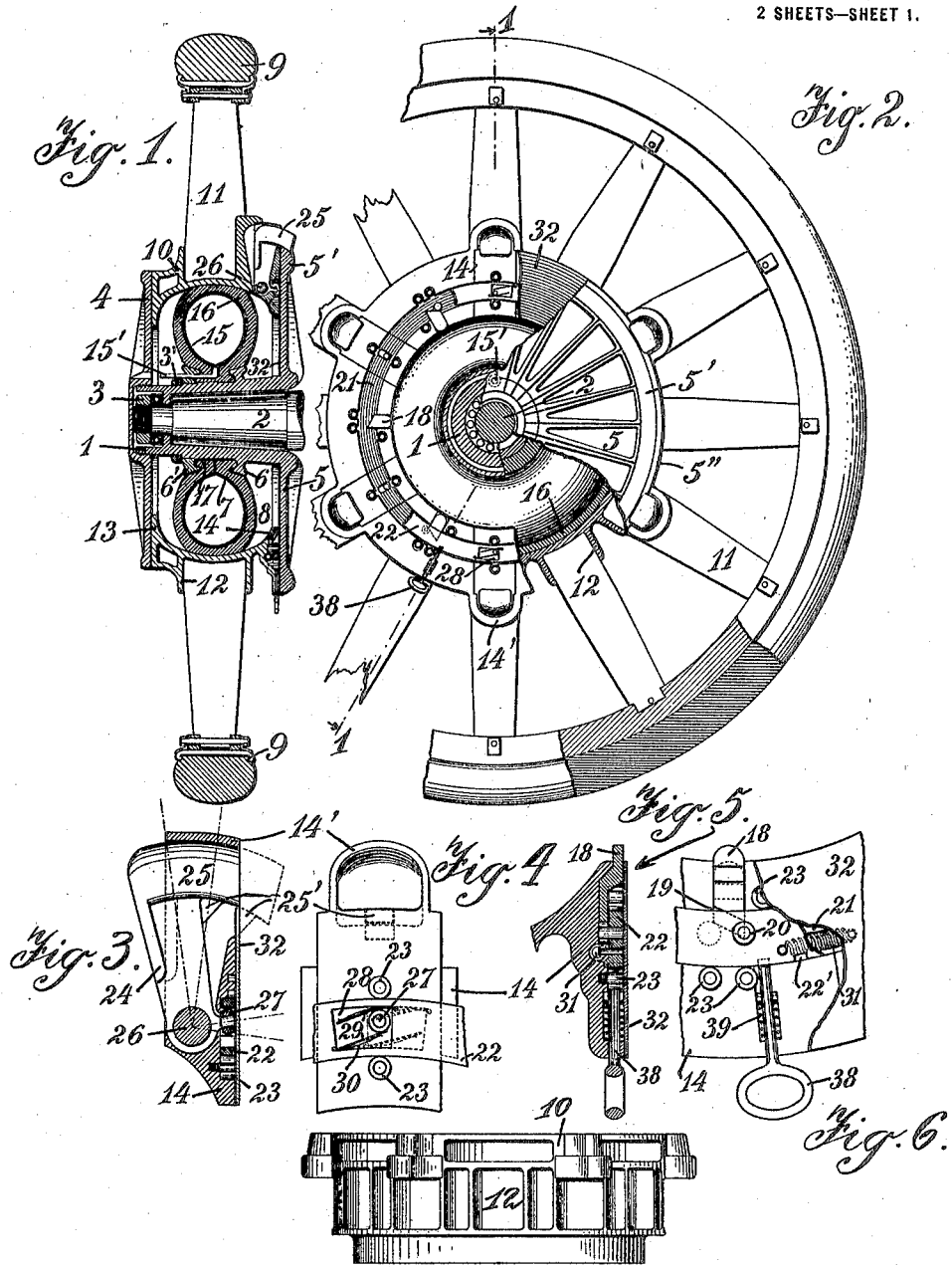

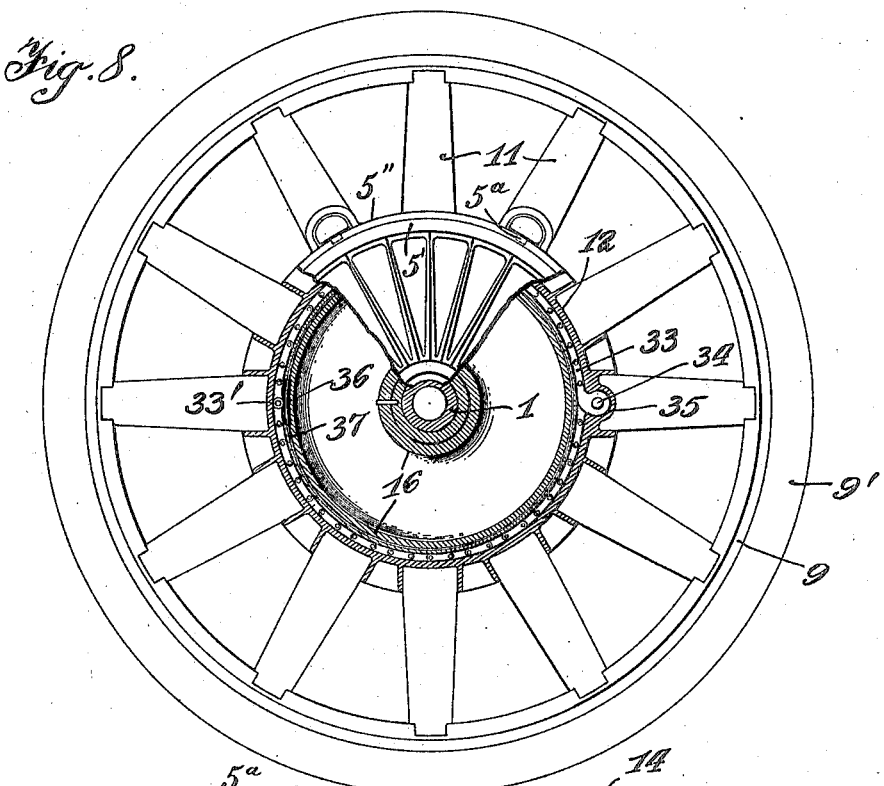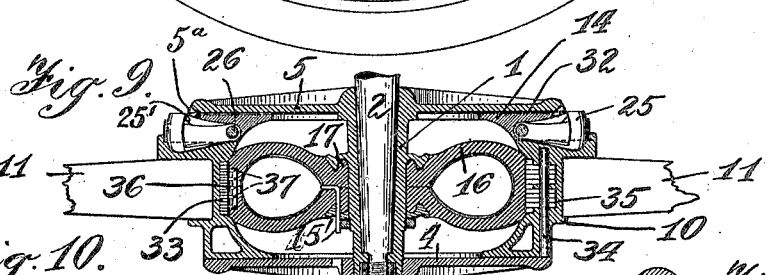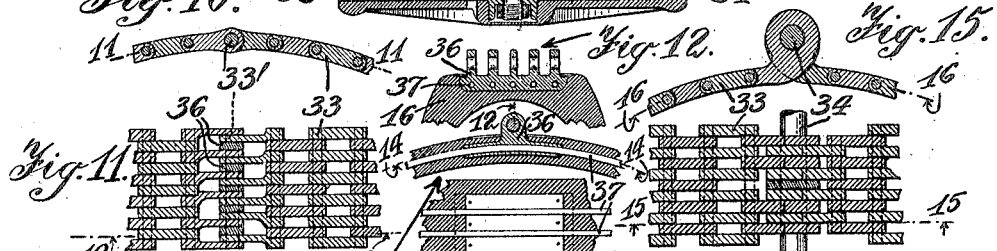

ADOLPH W. ECKHARDT, OF NEW YORK, N. Y.

PNEUMATIC VEHICLE-WHEEL.

1,393,514. Specification of Letters Patent. Patented Oct. 11, 1921.

Application filed February 27, 1920. Serial No. 361,779.

*To all whom it may concern:*

Be it known that I, ADOLPH W. ECKHARDT, a citizen of the United States, and a resident of the borough of Manhattan, city, county, and State of New York, have invented certain new and useful Improvements in Pneumatic Vehicle-Wheels, of which the following is a specification.

My invention relates to pneumatic wheels of the type in which a pneumatic cushion is interposed between the hub section and the rim section or tread section of the wheel. The object of my present invention is to construct a wheel of the character just mentioned in such a manner that upon any deflation of the pneumatic tube or cushion, the rim section will, by the continuing rotation of the wheel in either direction, be automatically locked and centered relatively to the hub section, so that the wheel may continue to travel without interruption, notwithstanding the failure of the pneumatic cushion. My invention also provides novel means for transmitting power from the inner or hub section to the outer or rim section, and further comprises other novel features the object and nature of which will appear from the description following hereinafter, while the scope of the invention will be indicated in the appended claims.

Reference is to be had to the accompanying drawings, in which Figures 1 to 7 inclusive illustrate my invention as applied to a wheel revolving loosely (such as the usual front wheel of an automobile), whereas Figs. 8 to 16 inclusive represent a drive wheel embodying my invention. Fig. 1 is an axial section of the wheel on the line 1—1 of Fig. 2; Fig. 2 is a view showing the wheel partly in elevation and partly in section in different planes perpendicular to the axis; Figs. 3 and 5 are partial axial sections illustrating certain details of the mechanism, on an enlarged scale, and Figs. 4 and 6 are corresponding views taken at right angles to the planes of Figs. 3 and 5; Fig. 7 is a top view of the drum or inner portion of the rim section; Fig. 8 shows the driving wheel, with parts in section in a plane perpendicular to the axis; Fig. 9 is a partial axial section of said driving wheel; Fig. 10 is a partial view of a chain forming part of said driving wheel, substantially in section on line 10—10 of Fig. 11, the latter being a section on line 11—11 of Fig. 10; Fig. 12 is a cross section of a portion of the pneumatic cushion of the driving wheel, on the line 12—12 of Figs. 13 and 14; Fig. 13 is a partial section on line 13—13 of Fig. 14; Fig. 14 is a section substantially on line 14—14 of Fig. 13; Fig. 15 is a section on line 15—15 of Fig. 16, showing another portion of the said driving wheel chain; and Fig. 16 is a section on line 16—16 of Fig. 15.

The hub section comprises a hub proper 1 mounted to turn on the axle 2, say by means of ball bearings and roller bearings, as indicated, and held in position by a nut 3 screwed on the outer end of the axle. The outer end of the hub is screw-threaded to receive the threaded central portion of a face plate 4, the inner surface of which is perpendicular to the axis of the wheel. At the inner end of the hub 1 is located a similar face plate 5, which, in the particular construction illustrated, is integral with the hub. The opposing faces of the plates 4 and 5, being perpendicular to the axis of the wheel, are parallel to each other. Between said face plates the hub 1 carries two annular external flanges 6, 6' having overhanging adjacent edges to form a recess or chamber of T-shaped or dovetail cross-section, as indicated at 7. This recess opens into the chamber 8 contained between the plates 4 and 5, the hub sleeve 1, and the inner portion of the rim section to be described presently. One of the flanges, 6, is shown integral with the hub sleeve 1, while the other flange, 6', is illustrated as detachably fitted on said sleeve, being adapted to slide thereon, and limited in its movement away from the companion flange 6, by a collar 3' screwed on the hub sleeve 1.

The rim section comprises a rim proper 9 carrying any suitable tread member, for instance a solid tire 9', and an inner portion 10, fitted between the parallel surfaces of the plates 4 and 5, and shown as a drum 10 connected with the outer or tread portion by means of spokes 11 the inner ends of which are set in suitable sockets 12 of said drum. Of course I do not restrict myself to the use of spokes as means for connecting the inner portion of the rim section with the outer portion thereof. On its sides, where it engages the plates 4 and 5, the drum 10 is made with flanges 13 and 14 respectively, their inner faces, which form the outer wall of the chamber 8, being preferably concave as shown. Within the chamber 8 is located the pneumatic cushion consisting of an air-tube of the same character as a pneumatic tire; 15 designates an inner tube or air-tube, inflatable in the well-known manner, and 16 indicates a shoe or casing surrounding said air-tube and having beads 17 which fit between the flanges 6, 6′ as shown; the shoe 16 being split lengthwise in the well-known manner along its inner circumference, while its convex outer circumference engages the concave inner face of the drum 10. When my invention is applied to a loose wheel, as in Figs. 1 to 7, the pressure due to the inflation of the air-tube 15 is sufficient to cause the pneumatic cushion to become connected firmly both with the rim section and with the hub section, so that the rotation of the outer or rim section will be transmitted, by said pneumatic cushion, to the inner or hub section. Of course, the pneumatic cushion thus interposed between the rim section and the hub section will take up jars, being even more efficient in this respect than a pneumatic tire, besides being safe from puncture, considering especially that the pneumatic cushion is contained entirely in a chamber inclosed on all sides by metallic walls of sufficient strength to prevent the entrance of any object liable to injure the said cushion. The tube or nipple 15′ for inflating the air tube 15 is accessible through an opening in the face plate 4.

So far as described above, the device will operate properly as long as the pneumatic cushion remains inflated. If, however, deflation should occur through any cause, as by leaking of the air-valve, or in consequence of the tube's 15 becoming porous, the hub section will no longer remain concentric to the rim section, but will sag relatively thereto. To overcome this objectionable action, and to maintain or restore the concentric relation of rim section and hub section even when the pneumatic cushion becomes unserviceable, I have provided the following arrangement: One of the flanges 13, 14, preferably the one (14) which is on the inner side of the wheel, that is to say, toward the body of the vehicle, is provided in its face with openings or sockets 14′, located at the outer edge of said flange, in a position normally beyond the outer edege of the adjacent plate 5, which edge is preferably strengthened by an annular rib 5′ of convex curvature. Six evenly spaced openings or sockets 14′ are indicated in the drawings, but I do not restrict myself to this special arrangement. At the inner edge of the flange 14 are provided radially sliding latches 18 (although a single latch might do) which in their normal position project from the inner edge of the flange 14 toward the hub proper 1, said normal position being shown in Fig. 5 and, by full lines, in Fig. 6. The outer edge of each of these latches or actuators is oblique or beveled, as indicated at 19, and engages a roller 20 supported as will be described below. The left portion of Fig. 2 shows three actuators 18 at 60° from each other, and at 30° from the adjacent openings or sockets 14′, thus indicating that there are six actuators 18 spaced evenly and alternating in position with the six openings 14′; the arrangement may however be varied. The flange 14 is further provided, between the radial slideways of the actuators 18 and the series of openings 14′, with an annular recess 21, on the face adjacent to the plate 5. Within this recess is mounted to slide circumferentially, to a limited extent, a ring 22 which carries the rollers 20 mentioned above. This ring or collar 22 is preferably guided by means of rollers 23 carried by the flange 14 and engaging both the inner and the outer edges of said ring. The flange 14 carries a number of arms or shanks 24 formed at their outer ends with hooks 25 movable in the sockets 14′ and adapted to be projected therefrom to extend over the outer edge of the face plate 5, as indicated at the upper portion of Fig. 1, although in their normal position said hooks are retracted, as shown by full lines in Fig. 3. Each arm 24 with its hook 25 is arranged to swing in a radial plane, about an axis 26 perpendicular to such radial plane, the several axes 26 lying in the same plane perpendicular to the axis of the wheel. The hooks 25 and the sockets 14′ in which they move, as well as the convex edge 5″ of the plate 5, are shown as curved according to arcs of circles the centers of which are on the respective axes 26. At the pivot end of each arm 24, and in the plane in which such arm moves, a pin is projected at right angles to the longitudinal axis of the arm, and on this pin I prefer to mount a roller 27 with a spherically-rounded surface. The roller and the end of the pin on which it is mounted, are located within a recess, chamber, or opening 28 formed in the ring 22, the radial end walls of said chamber coöperating with the roller 27 to stop or limit the circumferential movement of said ring relatively to the flange 14, that is, relatively to the rim section of the wheel. At diametrically or diagonally opposite corners of the chamber 28, flat strips or arms 29 are secured to the ring 22 in such a manner as to be capable of swinging or pivotal movement about axes parallel to the axis of the wheel, and leaf springs or other suitable springs 30 press the said arms or strips to keep them in contact with the roller 27 on opposite sides thereof, as shown best in Fig. 4, the two strips being parallel to each other, at a distance about equal to the diameter of the roller 27. A spring 31 contained in a suitable recess of the flange 14 (see Fig. 6), has one end secured to the flange 14 and the other to the ring 22, said spring exerting a longitudinal or circumferential pull on the ring 22 to keep it normally in the position indicated by full lines in Fig. 6, in which position the roller 20, by pressing against the oblique surface 19 of the actuator 18, causes the said actuator to project inwardly from the flange 14, as shown. Preferably a steel plate 32 (indicated in Figs. 1, 2, 3, 5, 6 and 9, but omitted from Fig. 4) is secured to the flange 14 on its face adjacent to the face plate 5, to cover the ring 22 and the recesses in which the rollers 23 are located, and to prevent the access of dust to these parts. If desired, a plurality of chambers 28 and of springs 31 might be provided.

Let us now consider what will occur if the pneumatic cushion interposed between the rim section and the hub section of the wheel should become defective or ruptured, so that the air-tube 15 would become deflated. Evidently, in this case, the hub proper 1, which under normal conditions is practically concentric with the rim section or tread section of the wheel, would be caused to sag by the weight of the vehicle resting on the axle 2. This sagging would cause the flanges 14 and the actuators 18 carried by the temporarily lower portion of the wheel, to be approached by the portion of the hub sleeve 1 adjacent to the face plate 5, and the hub sleeve 1 would come in contact with the inner (temporarily upper) ends of any actuators 18 then at the lower portion of the wheel, and press such actuators downwardly and outwardly, from the position shown in full lines in Fig. 6, to the position there indicated by dotted lines, where the inner end or head of the actuator is flush with the inner edge of the flange 14. As the actuator is thus depressed, its oblique or beveled outer end forces the roller 20, and with it the ring 22, laterally, or circumferentially of the wheel, against the tension of the spring or springs 31, the shifted position of the roller 20 being indicated by the dotted circle in Fig. 6. The circumferential movement of the ring 22 carries in a like direction the several spring-pressed strips 29. Owing to their inclined position, these strips will, if the particular roller 27 and arm 24 are free to move (which is the case for those at the upper half of the wheel), swing the said arm 24 on its pivot 26 in such a way as to project the hook 25 over the outer edge of the face plate 5, in the manner indicated at the upper portion of Fig. 1 and also, by dotted lines, in Fig. 3. At the lower half of the wheel, however, the arms 24 are held from swinging, because their free ends are engaged and blocked by the face plate 5, which, having sagged together with the hub, is in the path of the hooks 25, at the lower portion of the wheel. At the lower portion of the wheel, therefore, the hooks 25 will not swing on their pivots 26, but the strips 29 engaged by the rollers 27 of the respective arms will, by the circumferential movement of the corresponding rollers 20, be moved from their normal oblique position to a purely circumferential position, thereby placing the spring 30 which is nearer the center of the wheel, under additional tension. As the rim section now turns loosely in the chamber 8, between the face plates 4 and 5, the outer edge of the sagged face plate will ride up on the first hook 25 which has reached the projected position, and as the rotation of the wheel continues, the successive engagement of the said edge with various projected hooks 25 will gradually bring said plate, and with it the axle 2 of the wheel, to a position concentric with the rim section, all the hooks 25 being then in the projected position so that they will embrace the outer edge of the face plate 5 between them. It will be understood that during this operation, as soon as the centering of the hub has progressed far enough to make the edge of the face plate 5 clear a particular hook 25, that hook, under the influence of the spring 30 which has been put under increased tension, will be thrown into the projected position. When all the hooks have been thus projected, the hub section is not only centered relatively to the rim section, but locked thereto, so as to be compelled to rotate in unison therewith. It thus becomes possible to proceed to a place where repairs may be made more readily than on the road. The fact that the rim section is guided between parallel surfaces always perpendicular to the wheel axis, prevents the rim section from tipping sidewise, that is to say, the plane in which the rim section revolves will always be kept perpendicular to the axle 2. The weight of the vehicle will bear with sufficient force on the hooks 25 at the lower portion of the wheel, when the hooks are projected as described, to prevent slipping of said hooks circumferentially along the outer edge of the face plate 5, thus effecting a reliable mechanical coupling of the rim section with the hub section, under the conditions set forth. When the hub section has thus been centered, the actuators 18 no longer press the ring 22 to one side, and the spring 31 might pull said ring back to its normal position (resulting in a return of the hooks 25 to their normal inactive position). As a safeguard against this, I have shown a latch 38, which a spring 39 presses into a notch 22' of the ring 22 as soon as the latter is turned into the hook-projecting position.

The ring 22 thus remains locked in this position until the latch 38 is pulled out or released manually.

To remove the defective pneumatic cushion, the face plate 4 is unscrewed from the hub sleeve 1, thus exposing the pneumatic cushion on one side; preferably the collar 3' is also screwed outwardly, either to remove it entirely or to simply bring it farther away from the flange 6, and in either event the flange 6' is allowed to move away from the flange 6 so as to more readily release the beads 17 of the shoe or casing 16. Repairs can thus be made readily.

The construction shown in Figs. 8 to 16 embodies the parts described above in connection with Figs. 1 to 7, and in addition thereto comprises the following arrangement for effecting a positive driving connection between the outer periphery of the shoe or casing 16 and the inner circumference of the rim section: The drum 10 forming the inner portion of the rim section contains, at the periphery of its interior chamber, an endless chain made of pivotally-connected links, that is to say, a chain of the character known as a link-belt. At one point of its circumference, this circular chain 33 has a specially constructed link carrying a long pin 34 which is located farther from the center of the wheel than the other link pivots, and this pin 34 together with the link portions through which it extends, is received in a transverse recess 35 of the drum 10, the ends of the pin (and also its central portion, if desired, see Fig. 9) being received in suitable holes of the drum 10, in the preferred form of this feature; the chain 33 is thus compelled to rotate in unison with the drum 10, that is to say, with the rim section of the wheel. At a point of the chain diametrically opposite to the pin 34, the pivot pin 33' of the chain 33 extends through spaced lugs or brackets on a fork member 36 which is embedded or anchored in the shoe or casing 16 as shown best in Figs. 12 and 13, and the inner or embedded portion of said fork has holes for the passage of circular cables 37 which are embedded or interwoven in the fabric of said shoe and serve to increase the durability of the structure and also to distribute the strains uniformly. It will be understood that the spaces between the members or lugs of the fork 36 receive pivot ends of the adjacent chain links.

It will also be understood that the hub section of the wheel, being driven in any well-known or approved manner, will transmit the power through the pneumatic cushion to the fork 36, and through the chain 33 and pin 34 to the rim section of the wheel, under normal conditions. In the event of failure of the pneumatic cushion, the operation will be substantially the same as in the form of my invention first described, that is to say, in that case power will be transmitted from the hub section to the rim section through the projected hooks 25.

In each construction, the parts 15, 16 serve the double function of a pneumatic cushion and of transmitting rotation from one section of the wheel to the other.

It will be evident that the operation of my improved centering and mechanical coupling device will be equally certain and prompt whether the wheel is turning forward or backward at the time the failure of the air-cushion causes the actuators 18 to be engaged by the sagging hub section.

While I have referred to the flange 14 as if it were made of a single piece, the drawings illustrate a construction in which various parts of said flange are constructed as separate pieces or inserts. This has been done chiefly for the sake of convenience in manufacture and assembling, but in the actual operation of the device these parts are rigid with the body of the flange and just as effectively part of it as if they were integral therewith (as they might be).

In order to secure a more positive connection between the rim section and the hub section, particularly of the driving wheel, I may provide the hooks 25 with lugs 25' shown best in Fig. 3 and also indicated in Figs. 4 and 9, said lugs being adapted to project into notches 5ᵃ (Fig. 9) in the edge portion 5'' of the plate 5. The inner edges of these lugs 25' are preferably oblique, as shown, the notches 5ᵃ being shaped correspondingly, for the purpose of enabling these lugs to enter more readily into the respective sockets or notches.

I claim as my invention:

1. A vehicle wheel comprising a hub section, a rim section, a pneumatic cushion interposed between said sections and normally holding them in a concentric position, and means, operated by the mere movement of the hub section to an eccentric position without any rotation of such hub section relatively to the rim section, for effecting a mechanical positive driving connection between the hub section and the rim section.

2. A vehicle wheel comprising a hub section, a rim section, a pneumatic cushion interposed between said sections and normally forming a connection to compel said sections to rotate in unison, and also normally holding said sections in concentric position, and means, operated by the mere shifting of the hub section to an eccentric position which results from a failure of said pneumatic cushion, for effecting a direct rigid positive driving connection of the rim section with the hub section.

3. A vehicle wheel comprising a hub section, a rim section, a pneumatic cushion interposed between said sections and normally holding them in a concentric position, locking devices carried by one of said sections and movable relatively thereto lengthwise of the wheel axis, and adapted to be projected to a position in which they engage the outer edge of the other section, while normally said locking devices are in an inactive position, and means, operated by the shifting of the hub section to an eccentric position, for moving said devices from their normal retracted position to their projected locking position.

4. A vehicle wheel comprising a hub section, a rim section, an annular cushion section interposed between said first-named sections and normally holding them in a concentric position, locking devices carried by one of said first-named sections and movable relatively thereto lengthwise of the wheel axis, to and from a position in which they effect a direct positive driving connection with the other section, and means, operated by the shifting of the hub section to an eccentric position, for moving said devices from their normal inactive position into locking relation to the companion section.

5. A vehicle wheel comprising a hub section, a rim section, a cushion section interposed between said first-named sections and normally holding them in a concentric position, locking devices pivoted to one of the first-named sections to swing relatively thereto in axial planes and to come into and out of direct engagement with the other of said first-named sections, and means, operated by the shifting of said hub section to an eccentric position, for moving said devices from their normal inactive position to their engaging position.

6. A vehicle wheel comprising a hub section, a rim section, a cushion interposed between said sections and normally holding them in a concentric position, locking devices pivoted to one of said sections and movable into and out of engagement with the other section, and means, operated by the mere shifting of the hub section to an eccentric position without any rotation of such hub section relatively to the rim section, for moving said devices from their normal inactive position to their engaging position.

7. A vehicle wheel comprising a hub section, a rim section, a cushion interposed between said sections and normally holding them in concentric relation, one of said sections being provided with a flange, centering devices carried by the other section movably and adapted to be moved across the outer edge of said flange, and means, operated by the shifting of the hub section to an eccentric position, for shifting said devices over the outer edge of said flange and thus causing the concentric relation of the two sections to be restored by the engagement of said flange with said shifted devices as the wheel rotates.

8. A vehicle wheel comprising a hub section, a rim section, a cushion interposed between said sections and normally holding them in concentric relation, said hub section being provided with a flange, and centering members pivoted to the rim section and arranged to be projected over said flange, and means, operated by the shifting of the hub section to an eccentric position, for causing said members to be projected over the flange to center the hub section.

9. A vehicle wheel comprising a hub section, a rim section, a cushion interposed between said sections and normally holding them in concentric relation, a ring carried by one of said sections and mounted to turn thereon about the axis of the wheel, devices carried by the same section movably and adapted to be brought by the movement of said ring relatively to its carrier, into centering engagement with the other section, and means, operated by the shifting of the hub section to an eccentric position, for moving said ring relatively to the section carrying it, to the position which corresponds to the active position of said devices.

10. A vehicle wheel comprising a hub section, a rim section, a cushion interposed between said sections and normally holding them in concentric relation, a ring mounted on the rim section to turn about the axis of the wheel, devices carried by the rim section and adapted to be brought by the movement of said ring relatively to the rim section, into centering engagement with the other section, actuators carried by said rim section and movable thereon toward and from the center of the wheel, said actuators being adapted to be engaged and shifted outwardly by the hub section should the latter sag, and means for causing such outward movement of the actuators to produce such circumferential shifting of said ring as will bring said devices of the rim section into centering engagement with the hub section.

11. A vehicle wheel comprising a hub section, a rim section, a cushion interposed between said sections and normally holding them in concentric relation, a ring mounted on the rim section to turn circumferentially in relation thereto, devices carried by said rim section and adapted to be brought by the movement of said ring relatively to the rim section, into centering engagement with the hub section, through the medium of elastically-movable strips carried by said ring and engaging projections on said devices, an actuator slidable in and out upon the rim section, and adapted to be engaged and shifted outwardly by the hub section should the latter sag to an eccentric position, and means for causing this outward movement of the actuator to produce such circumferential shifting of said ring as will bring said devices of the rim section into centering engagement with the hub section.

12. A vehicle wheel comprising a hub section, a rim section, a cushion interposed between said sections and normally holding them in concentric relation, a ring mounted to turn on one of said sections about the axis of the wheel, devices carried by the same section movably and adapted to be brought by the movement of said ring relatively to its carrier, into centering engagement with the other section, means, operated by the shifting of the hub section to an eccentric position, for moving said ring relatively to the section carrying it, to the position which corresponds to the active position of said devices, and a device for locking said ring automatically to the section carrying it, when said ring has been shifted to said position.

13. A vehicle wheel comprising a hub section, a rim section, a cushion interposed between said sections and normally holding them in concentric relation, a ring mounted to turn on the rim section about the axis of the wheel, coupling devices carried by the rim section movably and adapted to be brought by a circumferential shifting of said ring from its normal position, into centering engagement with the hub section, means, operated by the shifting of the hub section to an eccentric position, for moving said ring relatively to the rim section, to the position which corresponds to the active position of said devices, and means, carried movably by said rim section, for locking said ring against circumferential movement when it reaches said position, said means being accessible for the release of the ring from its locked position.

14. A vehicle wheel comprising a hub section, a rim section, a pneumatic cushion interposed between said sections, and a chain associated with said rim section and cushion and secured at diametrically opposite points, to the cushion and to the rim section respectively.

15. A vehicle wheel comprising a hub section, a rim section, a pneumatic cushion interposed between said sections, and a circular chain interposed between said cushion and said rim section, said chain being secured to the cushion at one point, and to the rim section at a diametrically opposite point.

16. A vehicle wheel comprising a hub section, a rim section, a pneumatic cushion interposed between said sections, and a circular chain secured both to said rim section and to the cushion and interposed between them.

17. A vehicle wheel comprising a hub section, a rim section, a pneumatic cushion interposed between said sections, a cable embedded in said cushion at its outer portion, and a chain surrounding the cushion, said chain being secured to said cable at one point and to the rim section at a diametrically opposite point.

18. A vehicle wheel comprising a hub section, a rim section, an annular cushion interposed between said sections and normally holding them in concentric position, locking devices pivoted to one of the said sections to swing relatively thereto in axial planes and having lugs to engage notches of the other section, and means, operated by the shifting of said hub section to an eccentric position, for moving said devices to their active position.

19. A vehicle wheel comprising a hub section, a rim section, an annular cushion interposed between said sections and normally holding them in concentric position, locking devices, operated by the movement of the hub section to an eccentric position, for coupling the rim section to the hub section, said devices being movably carried by one of said sections and provided with lugs adapted to be projected into notches of the other section.

20. A vehicle wheel comprising a hub section, a rim section, an annular cushion interposed between said sections and normally holding them in concentric relation, a ring carried by the rim section and movable circumferentially thereof, means, operated by the movement of the hub section to an eccentric position, for thus moving said ring, centering devices carried by said rim section movably and adapted to be thrown into engagement with the hub section by the aforesaid circumferential movement of said ring, and means for automatically locking said ring against return movement.

In testimony whereof I have signed this specification.

ADOLPH W. ECKHARDT.